United States Patent [19]

Thomsen et al.

[11] Patent Number: 4,471,809

[45] Date of Patent: Sep. 18, 1984

[54] HYDRAULIC CONTROL APPARATUS WITH AN ADJUSTABLE THROTTLE

[75] Inventors: Svend E. Thomsen, Nordborg; Erik Kyster, Augustenborg; Soren N. Sorensen, Nordborg, all of Denmark

[73] Assignee: Danfoss A/S, Nordborg, Denmark

[21] Appl. No.: 390,181

[22] Filed: Jun. 21, 1982

[30] Foreign Application Priority Data

Jul. 2, 1981 [DE] Fed. Rep. of Germany ....... 3126041

[51] Int. Cl.³ .................... F16K 47/04; F16K 11/02; F15B 13/04
[52] U.S. Cl. ........................... 137/625.32; 137/625.3; 137/625.23; 251/205; 251/209; 91/467; 60/384
[58] Field of Search ................ 137/117, 625.3, 625.32, 137/625.23, 625.24; 251/209, 205; 91/467; 60/384

[56] References Cited

U.S. PATENT DOCUMENTS

| Re. 25,126 | 2/1962 | Charlson | 91/467 |
| 223,573 | 1/1880 | Ainsworth et al. | 137/625.32 X |
| 2,067,346 | 1/1937 | Rovinsky | 251/209 X |
| 2,888,943 | 6/1959 | Hipple | 137/117 X |
| 3,591,136 | 7/1971 | Bishop | 137/625.3 X |
| 3,638,867 | 2/1972 | Venus, Jr. | 137/625.32 X |
| 4,262,689 | 4/1981 | Rodder | 251/209 |
| 4,285,366 | 8/1981 | Elser | 137/625.3 X |

FOREIGN PATENT DOCUMENTS 516614 12/1939 United Kingdom ........... 137/625.23

OTHER PUBLICATIONS

Vacuum, vol. 22, No. 2, Pergamon Press, Great Britain, Author, Ridner et al., 2/1972.

Primary Examiner—Arnold Rosenthal
Attorney, Agent, or Firm—Wayne B. Easton

[57] ABSTRACT

The invention relates to a hydrostatic steering control unit of the type having valving for an open center neutral position which bypasses pressurized fluid from the pump to the tank when in neutral. During a turning operation with a steering wheel the open center valving is caused to close and the pressurized fluid is directed to one side or the other of a servomotor which is connected to wheels to be steered. The open center valving includes orifices in relatively rotatable elements which are aligned in the neutral position and closed to effect the turning operation. Open center valving can be the cause of noise and cavitation and such valving herein is provided with slot shaped orifices and flat generally wedge shaped throttle passages to minimize the noise and cavitation problems. The throttle passages are defined by curved bounding surfaces having rectangularly shaped outlines. A characteristic of the curved surfaces is that they are formed with exponentially shaped sections.

9 Claims, 11 Drawing Figures

HYDRAULIC CONTROL APPARATUS WITH AN ADJUSTABLE THROTTLE

The invention relates to a hydraulic control apparatus with an adjustable throttle, wherein two relatively movable valve elements comprise respective first and second control orifices which are associated with a common sealing face and are each bounded on at least one side by an edge extending transversely to the direction of movement.

In a known control apparatus of this kind (DE-OS No. 23 53 068), namely a steering device, two sleeve-shaped rotary valve elements provided in a housing bore can be turned relatively to each other through a limited angle out of a neutral position by means of a steering wheel against the force of return springs. The valve elements comprise control orifices which form a plurality of throttles. These include a neutral position throttle which is open in the neutral position to discharge pressure fluid from the pump direct to the container and closes after relative rotation through a predetermined angle, whilst throttles in the supply and return open simultaneously to lead pressure fluid through a metering motor to the servo-motor of the steering device and back from the latter to the container. The neutral position throttle consists of four throttling points of a first type and eight throttling points of a second type, all connected in parallel. The throttling points of the first type have control orifices bounded by edges extending in the axial direction. In the second type, the control orifices in the outer valve sleeve consist of larger bores and circumferentially offset smaller bores. The control orifice at the inner valve sleeve comprises a first axial groove section having the breadth of the larger bores and a second axial groove section having the breadth of the smaller bores. With the aid of the last-mentioned throttling points, it is intended to produce a flatter gradient for the characteristic curve of the pressure drop.

These and similar control apparatuses with throttling action, e.g. priority valves, are predominantly included in circuits containing return or regulating cycles. During different operating conditions, instabilities arise which become noticeable for example by pressure fluctuations within the system. These instabilities cannot be removed by imparting a shallower gradient to parts of the characteristic curve of the throttle.

It is the object of the invention to provide a control apparatus of the aforementioned kind which facilitates a higher stability during operation.

This problem is solved according to the invention in that a bounding surface adjoining the edge of the second control orifice over at least the major part of its length has a spacing from the sealing face which decreases in the direction of movement so that, upon relative motion between the bounding surface and sealing face, a flat throttle passage is formed with a variable length and a large breadth relatively to its depth, and that over at least a part (hereinafter termed exponential section) of the bounding surface its spacing from the sealing face substantially follows an e function lengthwise of the throttle passage.

In this construction, characteristic throttle curves applicable to different amounts of throughflow possess substantially the same gradient for an equal pressure drop. If the throughflow alters, whether because of the throttling step or the fact that an associated pump is driven at variable rotary speed such as from a vehicle engine, substantially the same inclination still exists for a predetermined pressure drop and this is introduced in the regulating circuit as amplification. Consequently, one obtains the desired high stability.

The desired effect is achieved with the aid of the flat and broad throttle passage of variable length. By shaping the one bounding surface, the characteristic curves can be very markedly influenced. With the aid of the section of this bounding surface that substantially follows an e function, one can give the group of characteristic curves substantially the same gradient for each predetermined pressure drop. In addition, the fluid flows through the flat throttle passage as a comparatively thin film making contact with the sealing face or the bounding surface over a large area. By reason of the friction at these surface areas and the friction between adjacent fluid layers in the film, the fluid as a whole is strongly braked. Comparatively short throttle passages will therefore suffice to bring about strong throttling. This nature of throttling does not give rise to undesired increases in speed; consequently, one does not obtain excessively loud noise nor cavitation phenomena.

Advantageously, adjoining one end of the exponential section, the bounding surface comprises an end section which gradually extends from the exponential section up to zero spacing from the sealing face. In this way one can fully close the throttle after a finite operating path.

Further, it is favourable if the bounding surface comprises as an adjunct to the other end of the exponential section a starting section of which the tangential angle as measured between the tangents to the sealing face and bounding surface in extension of the edge of the first control orifice is no more than the tangential angle at the adjoining end of the exponential section and decreases towards the second control orifice. As soon as this starting section overlaps the edge of the first control orifice, one obtains a flattening in the characteristic throttling curve that is of interest in relation to control apparatuses for steering devices and the like, as will hereinafter be explained.

Although small transition angles are basically permissible, the starting section and/or end section preferably adjoinst the exponential section tangentially.

If both sides of the control orifices are bounded by parallel edges, a bounding surface may adjoin each of the two edges of the second control orifice. This will then result in a throttle which is effective in both directions of rotation.

When using sleeve-shaped rotary valve elements, it is advisable for the bounding surfaces to be formed at the outer circumferential surface of the inner rotary valve element. Since this circumferential surface is concavely curved, tools for producing the bounding surfaces can be readily applied.

In particular, the starting section and/or the end section may form a planar surface. This is particularly easy to produce.

Advantageously, the bounding surfaces are ground. However, other methods are also feasible, for example the chemical removal of material or a spark errosion process.

In a further embodiment, the throttle is formed by at least two parallel like throttling points with first and second control orifices as well as similar throttling passages. In this way, the sum of the breadths of all the throttling passages will be effective. There is no difficulty in making the throttling passages as flat as is necessary for noise reduction, even if there is limited space on the valve elements.

Preferred examples of the invention will now be described in more detail with reference to the drawing, wherein.

Figure 1:
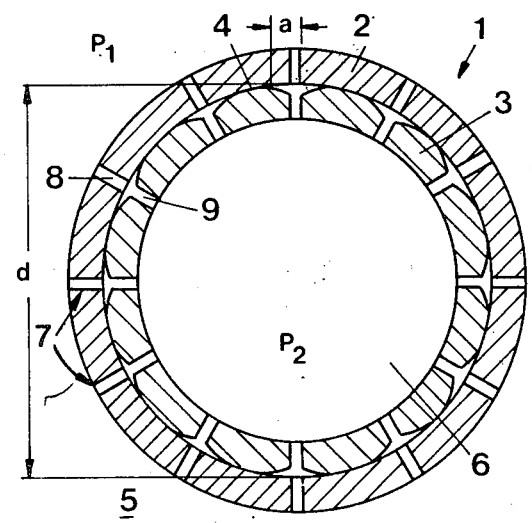
FIG. 1 is a cross-section through a throttle of a control apparatus according to the invention that is formed by means of a rotary valve having sleeve-shaped rotary valve elements.

FIG. 1 shows an adjustable throttle 1 formed on a rotary valve comprising an outer rotary valve sleeve 2 and an inner rotary valve sleeve 3. Between these, there is a cylindrical sealing face 4. It is assumed that the pump pressure $P_1$ obtains in the space 5 beyond the rotary valve. The container pressure $P_2$ obtains in the inner cavity 6. In other respects, the rotary valve may have a conventional construction such as that shown in DE-OS No. 23 53 068.

The throttle 1 consists of a multiplicity of like throttling points 7 connected in parallel. Each of these throttling points 7 comprises a first control orifice 8 in the outer rotary valve sleeve 2 and a second control orifice 9 in the inner rotary valve sleeve 3. The control orifices are in the form of slots extending from the end 10 of the sleeves as is shown for the control orifice 9 in FIG. 2.

Each control orifice 8 has two edges 11 and 12 and each control orifice 9 has two edges 13 and 14 as boundaries. All these edges are parallel. The edges may be angular in cross-section as is illustrated but they may also be rounded. Respective bounding surfaces 15, 16 adjoining the edges 13 and 14 are adapted to form a throttling passage 17 together with the sealing face 4. The throttling passage 17 of each throttling point 7 has a maximum depth t which is very much exaggerated in the drawing, a maximum length l and a breadth b. The breadth b is large compared with the maximum depth t; it is at least 20 times the maximum depth t, usually more than 50 times and very often 100 times or more. With n parallel like throttling points, the sum B of the breadths b of all the throttling passages is effective, i.e. $B = nb$. The width $w_1$ of the control orifice 8 is equal to the width $w_2$ of the control orifice 9. Their breadth corresponds to the breadth b.

In one example, the dimensions were as follows:
Width $w_1 = 0.6$ mm
Width $w_2 = 0.6$ mm
Length $l = 1.5$ mm
Breadth $b = 10.0$ mm
Depth $t = 0.06$ mm
Throttling points $n = 12$
Diameter d of sealing face $4 = 32$ mm.

From these dimensions, one obtains a sum B of breadths of the throttling passages 17 of 120 mm, a circumference for the sealing face 4 of 100 mm and an operating path a from the open neutral position to the closed position of 2.1 mm. It follows that the sum B of the breadths is larger than the circumference of the sealing face 4.

Preferably, the greatest depth is no more than 0.2 mm and in particular less than 0.1 mm. The longest length should be between 1.0 mm and 4.5 mm and, in a rotary valve, correspond to a central angle of between 4° and 15°. The sum B of the breadths is correspondingly large if, for example, 8 to 18 of such throttling passages are connected in parallel.

Figure 4:
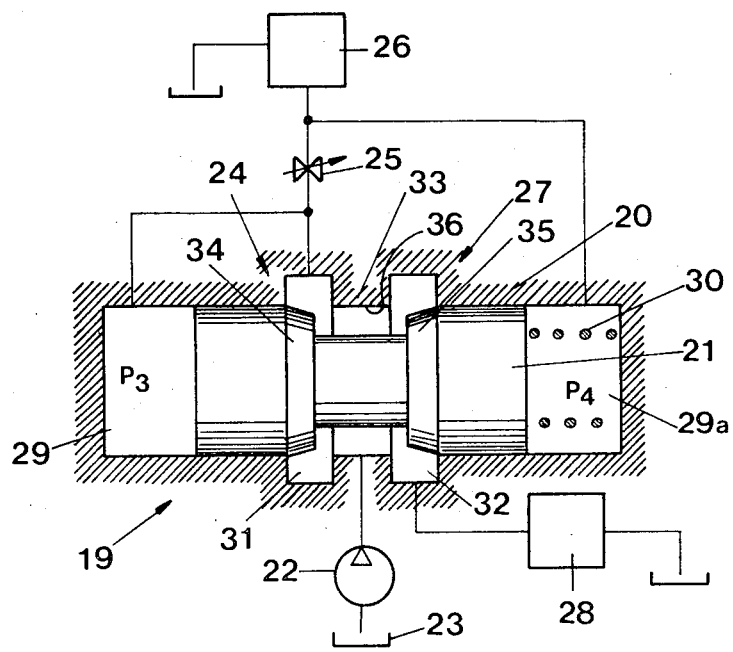
FIG. 4 is a longitudinal section through a control apparatus according to the invention in the form of a priority valve.

In the FIG. 4 embodiment, the control apparatus consists of a priority valve 19 comprising a piston 21 displaceable in a housing 20. A pump 22 sucks compression fluid from a tank 23 and delivers it by way of a first throttle 24 of the priority valve and a quantity setting device 25 with an adjustable throttle to a preferred first consumer 26 as well as by way of a second throttle 27 to a second consumer 28. The piston 21 is subjected at one end to the pressure $P_3$ in the pressure chamber 29 derived from the first setting device 25 and at the other end to a spring 30 as well as the pressure $P_4$ in the pressure chamber 30 derived behind the setting device 25. The greater the demand of pressure fluid at the consumer 26, the more will the throttle 24 open and the throttle 27 close.

As a first control orifice, the throttle 24 comprises a fixed annular groove 31 and the throttle 27 a fixed annular groove 32. The two throttles have a common second control orifice in the form of an annular groove 33 in the piston 21. The throttle 24 comprises a bounding surface 34 and the throttle 27 comprises a bounding surface 35. Together with a cylindrical sealing face 36, they both form a respective throttling passage when the piston 21 has been axially displaced through a corresponding distance.

Figure 5:
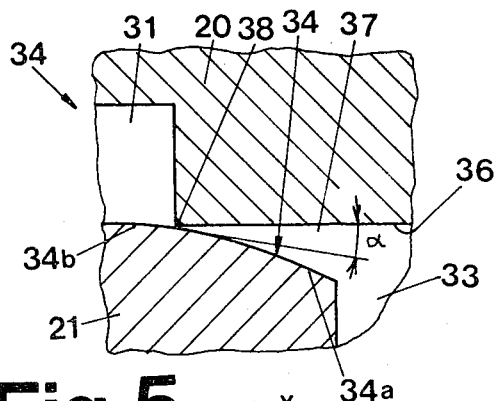
FIG. 5 is a diagrammatic view of a throttling passage in an axial valve.

This throttling passage 37 is shown to a larger scale in FIG. 5. Its size is shown very much exaggerated. The bounding surface 34 consists of an exponential section 34a of which the spacing from the sealing face 36 lengthwise of the throttle passage 37 substantially follows an e function, and an end section 34b which extends to zero spacing from the sealing face 36. Upon movement of the piston 21 in the direction x, the throttle passage 37 continues to become longer until it reaches the fully closed position. The tangential angle $\alpha$ measured in extension of the edge 38 of control orifice 31 between the tangent to the sealing face 36 and the tangent to the bounding surface 34 increases continuously towards the control orifice 33.

Figure 2:
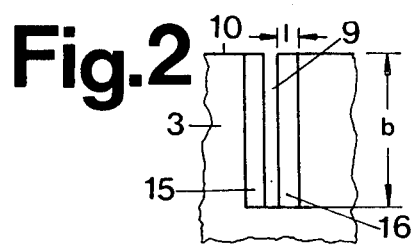
FIG. 2 is a fragmentary plan view of an end section of the surface of the inner rotary valve sleeve.
Figure 3:
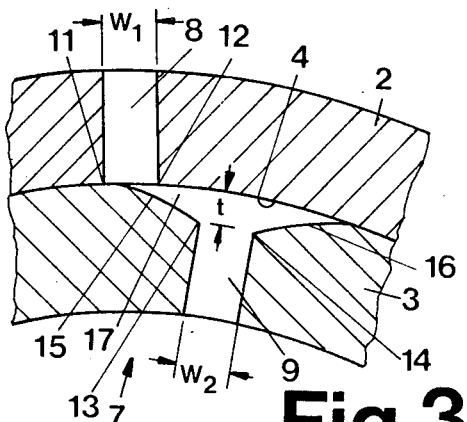
FIG. 3 is an enlarged part-sectional view of the rotary valve in FIG. 1.
Figure 6:
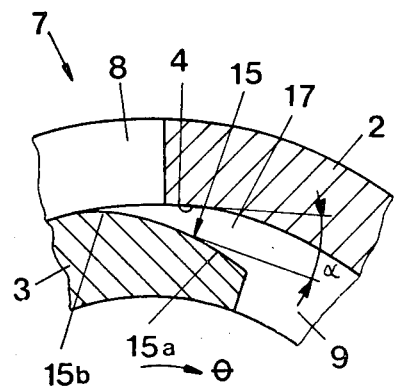
FIG. 6 is a diagrammatic representation of a throttling passage in a rotary valve having sleeve-shaped valve elements.

FIG. 6 illustrates a similar portion for the throttle passage 17 of the FIGS. 1 to 3 example. The relative angle of rotation between the two rotary valve sleeves 2 and 3 is designated $\theta$. Here, again, the bounding surface 15 comprises an exponential section 15a and an end section 15b which leads therefrom to zero spacing.

Figure 7:
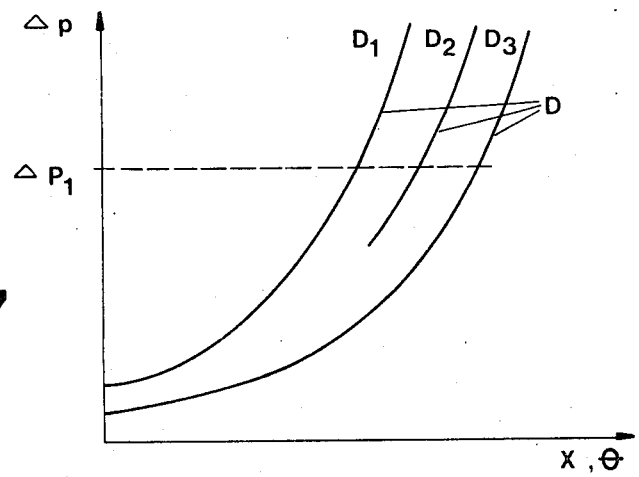
FIG. 7 are throttling graphs for the throttling passages of FIG. 5 or FIG. 6.

In both cases, pressure drops p are obtained over the distance of displacement x or θ in accordance with the characteristic curves D in FIG. 7. The characteristic curve $D_1$ applies to a larger throughflow, the curve $D_2$ to a medium throughflow and the curve $D_3$ to a smaller throughflow in the respective throttle. By reason of the throttling passages used and of their shaping, all the curves D have substantially the same gradient in the operating range for a predetermined pressure drop, e.g. $\Delta p_1$. Consequently, if the operating point between the characteristic curves changes as a result of fluctuations in the throughflow, the amplification in the regulating circuit remains substantially constant. This leads to the desired high stability.

Figure 8:
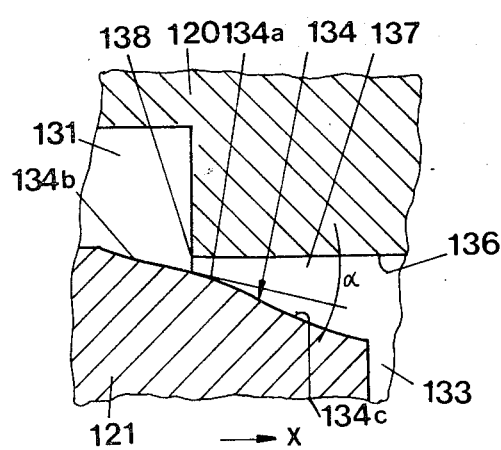
FIG. 8 is a diagrammatic representation of a modified throttling passage in an axial valve.

FIG. 8 shows a modification in which the reference numerals of FIG. 5 are increased by 100. Here, the bounding surface 134 consists of an exponential section 134a, an end section 134b leading to a spacing 0 and a starting section 134c of which the tangential angle α at the junction to the exponential section 134a coincides with the tangential angle of the latter and becomes smaller towards the control orifice 133. The tangential angle Δ of the end section 134b likewise decreases towards the second control orifice 133.

Figure 9:
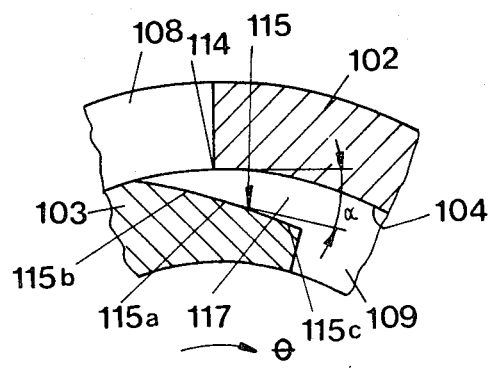
FIG. 9 is a diagrammatic representation of a similar throttling passage in a rotary valve having sleeve-shaped valve elements.

The control passage 117 in FIG. 9, in which the reference numerals are increased by 100 over those in FIG. 6, has a similar shape. Here, again, the bounding surface 115 is composed of an exponential section 115a, an end section 115b and a starting section 115c.

Figure 10:
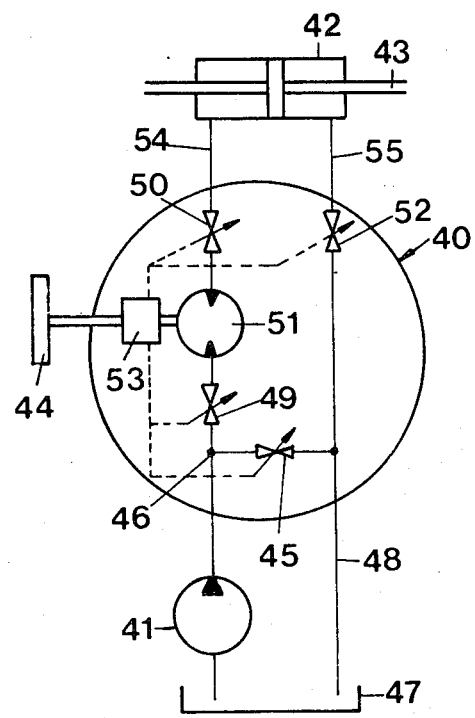
FIG. 10 is the circuit diagram of a control apparatus having a throttle according to FIG. 1.

FIG. 10 illustrates a control apparatus 40 of a steering device for motor vehicles. It is fed by a compression pump 41 driven, for example, by the vehicle engine and serves to control a servo-motor 42 of which the piston rod 43 is connected to wheels to be steered depending on the rotation of a hand wheel 44. The control apparatus 40 comprises an adjustable throttle 45 having the construction of the throttle 1 with throttle passages according to FIG. 9 and it can connect the pump connection 46 directly to a conduit 48 leading back to the container 47. Further, there are two series-connected supply throttles 49 and 50 and, between them, a metering motor 51, and a return throttle 52. The throttles 45, 49, 50 and 52 are actuated in unison by a setting device 53 which is adjusted in response to the steering wheel 44 and the metering motor 51. The circuit is shown for one operating direction of the servo-motor 42. In the opposite direction, the operating conduits 54 and 55 leading to the servo-motor 42 and their associated throttles are exchanged by reversing means within the control apparatus 40. In the neutral position, the adjustable throttle 45 is fully open so that the pressure side of the pump is connected directly to the container 47; the supply throttles 49 and 50 as well as the return throttle 52 are closed. Upon displacement out of the neutral position, the adjustable throttle 45 closes gradually whereas the supply throttles 49 and 50 open. The return throttle 52 opens somewhat later.

Figure 11:
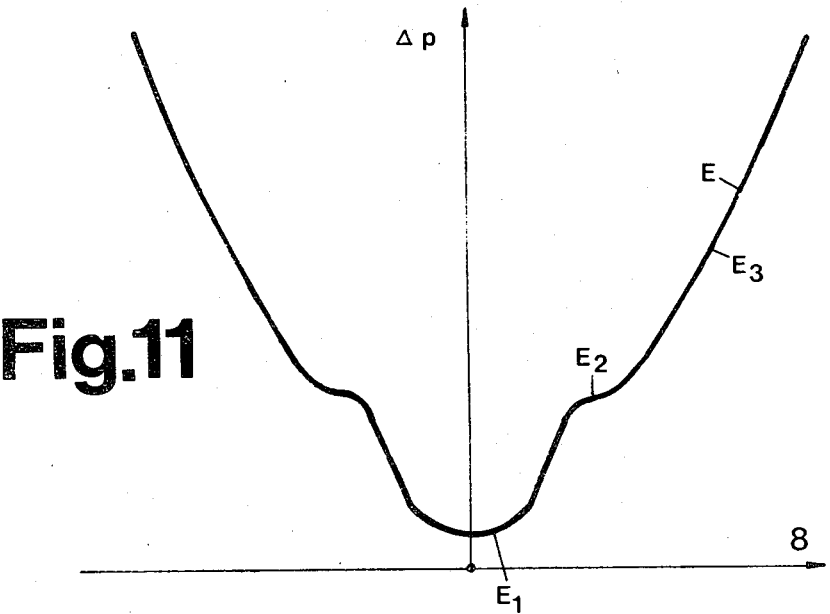
FIG. 11 is a throttling graph for a control apparatus according to FIG. 10 using a throttling passage according to FIG. 9.

FIG. 11 shows the characteristic throttling curve for the operation of this control apparatus 40. The characteristic throttling curve E is applicable for a certain amount of throughflow. In the neutral position, it has a flat section $E_1$ produced in that the control orifices 108 and 109 are to a large extent in registry not only in the neutral position but also to both sides thereof, for which reason there is little throttling. For setting the pressure drop Δp, it is therefore harmless if the rest position of the control apparatus is disposed slightly beyond the accurate neutral position. As soon as the starting section 115c overlaps the edge 114, the throttle passage 117 starts to be effective; since the depth does not change much to begin with, there is a flat position $E_2$ in the characteristic curve E. This flat position is so disposed that, with a control device where the supply throttles 49, 50 open at a smaller angle Δ than do the return throttles 52, slight inaccuracy in the opening instant of the return throttle 52 will not have a disturbing influence on the pressure conditions. The section $E_3$ of the characteristic curve is for the most part determined by the exponential section 115a. It serves the actual pressure control operation.

We claim:

1. A hydraulic control steering apparatus, comprising, a throttle valve unit having fixed and moveable valve elements forming an adjustable throttle relative to a sealing face on said element, said fixed element having a slot shaped orifice with edges in said sealing face, said moveable element having bounding throttle surfaces with trailing edges engageable with said sealing face and leading edges spaced a distance t from said sealing face, said moveable element having a slot shaped orifice with transversely extending edges thereof defined by said leading edges of said bounding surfaces, said bounding surfaces being respectively cooperable with said edges of said fixed element orifice and forming a variable length throttle passage with said sealing face, said throttle passage being relatively flat by reason of said bounding surface having a large breath relative to said t, and at least one of said bounding surfaces having an exponential function section relative to said sealing surface.

2. A control apparatus according to claim 1 characterized in that adjacent said exponential function section said bounding surface has an end section which gradually extends from said exponential section up to zero spacing from said sealing face.

3. A control apparatus according to claim 1 characterized in that adjacent said exponential function section said bounding surface has a starting section of which the tangential angle (α) as measured between the tangents to said sealing face and said bounding surface in extension of said trailing edge of said first element control orifice is no more than the tangential angle at the adjoining end of said exponential section and decreases towards said bounding surface leading edge.

4. A control apparatus according to claim 2 characterized in that sections of said bounding surface on opposite sides of said exponential function section adjoin said exponential section tangentially.

5. A control apparatus according to claim 1 in which said leading and trailing edges of said fixed element orifice are parallel to each other and said leading and trailing edges of said moveable element bounding surface are parallel to each other.

6. A control apparatus according to claim 1 wherein said elements are inner and outer sleeve-shaped rotary valve elements, said bounding surface being formed at the outer circumferential surface of said inner rotary valve element.

7. A control apparatus according to claim 4 characterized in that said sections on opposite sides of said exponential section form planar surfaces.

8. A control apparatus according to one of claims 1 characterized in that said bounding surface is ground.

9. A control apparatus according to claim 1 characterized in that said apparatus includes a plurality of said throttle valve units.

* * * * *